United States Patent
Kuku et al.

(10) Patent No.: US 12,012,330 B2
(45) Date of Patent: *Jun. 18, 2024

(54) PROCESS OF MIXING TWO COMPOUNDS TO CHEMICALLY OBTAIN A SOLID COMPOUND AND AN ALKALINE LIQUID SOLUTION

(71) Applicant: GLOBAL CARBON EMISSIONS SOLUTIONS LLC, Gilbert, AZ (US)

(72) Inventors: Lai O. Kuku, Gilbert, AZ (US); Michael P. Woudenberg, Phoenix, AZ (US); Kyle J. Koleber, Phoenix, AZ (US); Gypsy M. Biller, Chandler, AZ (US)

(73) Assignee: Global Carbon Emissions Solutions, LLC, Gilbert, AZ (US)

( * ) Notice: Subject to any disclaimer, the term of this patent is extended or adjusted under 35 U.S.C. 154(b) by 145 days.

This patent is subject to a terminal disclaimer.

(21) Appl. No.: 17/403,760

(22) Filed: Aug. 16, 2021

(65) Prior Publication Data

US 2022/0340426 A1    Oct. 27, 2022

Related U.S. Application Data

(60) Provisional application No. 63/181,237, filed on Apr. 29, 2021, provisional application No. 63/180,639, filed on Apr. 27, 2021.

(51) Int. Cl.
*C01B 25/32* (2006.01)
*C01D 1/20* (2006.01)
*C01D 7/02* (2006.01)

(52) U.S. Cl.
CPC .............. *C01B 25/325* (2013.01); *C01D 1/20* (2013.01); *C01D 7/02* (2013.01)

(58) Field of Classification Search
None
See application file for complete search history.

(56) References Cited

U.S. PATENT DOCUMENTS

| 8,119,091 B2 | 2/2012 | Keith et al. |
| 8,501,105 B2 | 8/2013 | Fan et al. |

(Continued)

FOREIGN PATENT DOCUMENTS

| CN | 106512678 A | 3/2017 |
| FR | 3108859 A1 | 10/2021 |

(Continued)

OTHER PUBLICATIONS

Andreola et al, "Effect of Water Losses by Evaporation and Chemical Reaction in an Industrial Slaker Reactor," Brazilian Archives of Biology and Technology, vol. 50, n. 2: pp. 339-347, Mar. 2007 (Year: 2007).*

(Continued)

*Primary Examiner* — Colin W. Slifka

(57) ABSTRACT

The subject process relates generally to producing an aqueous solution through a simple but highly effective chemical reaction. The aqueous solution is composed of a blended solution with water and an added solubilizer for the chemical reaction. The results produce an ionic solid and an alkaline liquid solution which are useful commercial products, and various applications including but not limited to use as a $CO_2$ capture solvent.

4 Claims, 2 Drawing Sheets

(56) References Cited

U.S. PATENT DOCUMENTS

| | | |
|---|---|---|
| 8,702,847 B2 | 4/2014 | Lackner et al. |
| 8,741,244 B2 | 6/2014 | Jones |
| 9,833,739 B1 | 12/2017 | Kuku et al. |
| 9,981,220 B2 | 5/2018 | Kuku et al. |
| 11,612,858 B2 * | 3/2023 | Kuku .................. C02F 9/00 423/232 |
| 2010/0051859 A1 | 3/2010 | House et al. |
| 2010/0251937 A1 | 10/2010 | Murray et al. |
| 2019/0160395 A1 | 5/2019 | Saini |

FOREIGN PATENT DOCUMENTS

| | | |
|---|---|---|
| WO | WO2017029509 A1 | 2/2017 |
| WO | WO2020016012 A1 | 1/2020 |

OTHER PUBLICATIONS

Machiela et al, "Regeneration of alkali leaching solution through precipitation using calcium hydroxide," Hydrometallurgy, 181, 2018, pp. 35-42 (Year: 2018).*

World Resource Review vol. 16 No. 2: p. 158, para 3; p. 159 Para 1-2.

* cited by examiner

PROCESS OF MIXING TWO COMPOUNDS TO CHEMICALLY OBTAIN A SOLID COMPOUND AND AN ALKALINE LIQUID SOLUTION

TECHNICAL FIELD

The subject design relates generally to a process that produces an aqueous solution through a remarkably simple but highly effective chemical reaction. The aqueous solution is composed of a blended solution with water and an added solubilizer for the reaction. The results produce an ionic solid and an alkaline liquid solution which is a useful commercial product.

BACKGROUND

In the past, there has been a lot of discussions with respect to the levels of carbon dioxide ($CO_2$) in the atmosphere. Various attempts have been made by many people to come up with processes to remove the carbon dioxide. For example, U.S. Pat. No. 8,119,091 teaches the use of a multiple step process in which sodium carbonate is treated by causticization to generate carbon dioxide and sodium dioxide. It does not teach the use of sodium hydroxide for the capture of carbon dioxide. U.S. Pat. No. 9,833,739 which issued on Dec. 5, 2017 to Kuku et al teaches the use of a two-step process within which calcium carbonate is used to capture carbon dioxide in a first wet scrubber. The second step involves the use of a reaction chamber within which a solubilizer, such as glycerol is added to calcium hydroxide. This addition enhances its solubility to reduce flue gases from a fossil fuel power plant and generate calcium carbonate for use in the wet scrubber. Various patents and publications including Pub. No. 2010/0251937 A1, WO 2017/029509, and US 2010/0251937 all teach processes consisting of contacting carbon dioxide laden gas with lime in a reactor such that the lime captures carbon dioxide by the formation of calcium carbonate. The calcium oxide or lime is regenerated by calcination leading to the formation of fresh lime sorbent and the release of a concentrated stream of carbon dioxide. The "regenerated" lime is then recycled for the future capture of carbon dioxide. This carbonation-calcination process requires heat and the processes are similar to the methods used in the production of cement worldwide. U.S. Pat. No. 9,981,220 issued to Kuku et.al teaches the use of an acid dosing system for the removal of dissolved $CO_2$ from water, and the precipitation of calcium sulfate in the acid dosing and degassing process. The use of hydrophobic membranes for degassing are known processes.

In an article published in the WORLD RESOURCE REVIEW vol. 16 NO. 2, the article teaches the desire to remove $CO_2$ directly from the atmosphere. The process starts with an alkaline liquid sodium hydroxide to remove the $CO_2$ from the ambient air which results in sodium carbonate ($Na_2CO_3$). The sodium carbonate is then mixed with calcium hydroxide to produce sodium hydroxide and calcium carbonate in a process known as causticizing. The calcium carbonate is thermally decomposed, precipitates, washed, and then dried to produce lime (CaO). This process is totally different from the subject design, since in the subject process both an alkaline liquid solution and an ionic solid are being chemically produced.

There are several different blended solutions and solubilizers that could be mixed to chemically produce important commercial compounds. Such as, for example but not limited to, calcium hydroxide, calcium carbonate (blended solutions), and sodium bicarbonate, sodium carbonate, sodium phosphate, lithium phosphate, potassium phosphate, lithium carbonate, and potassium carbonate (solubilizers). Several of these solutions are not readily available and/or expensive to buy or produce.

For example, sodium carbonate is either found naturally or is manufactured from sodium chloride (common salt). There are two main sources of sodium carbonate. They are from salt and calcium carbonate (Solvay process) or made from sodium carbonate and hydrogen carbonate ores (trona and nahcolite mined). Sodium carbonate has many uses, for example but not limited to, paper and manufacturing glass. The production of sodium carbonate also requires high heat energy and a high array of equipment to complete the process. Ammonia is one of the most expensive materials used in the process and any impurities in the ammonia can cause corrosion in various high temperature areas of the process. The process also requires mined limestone and coke. All of this adds major costs to the process.

Sodium hydroxide is another solution that has been used in the capture of $CO_2$, as set forth in the article published in the WORLD RESOURCE REVIEW vol. 16 NO. 2 noted above. In the noted paper, their process starts with sodium hydroxide ((NaOH). Their attempt to recover sodium hydroxide has a rather involved process, by itself, which adds heavily to their overall costs. Sodium hydroxide can be defined as a strong base of an alkali metal. It has varied applications including being used in manufacturing of soap, detergents, paper and many other different chemicals. It is also used in petroleum refining, in laboratories, or in the purification of aluminum ore, bauxite and many more. This has led to manufacturing of sodium hydroxide on an industrial scale.

The current commercial manufacturing technology, referred to as 'chlor-alkali', produces sodium hydroxide and chlorine as coproducts. As is well known, this is accomplished by passing an electric current through a salt solution (common sodium chloride). This process has not been used in the United States for many years because it cannot compete with the production of electrolytic sodium hydroxide. Production of electrolytic sodium hydroxide is the preferred version due to the lesser cost over other processes. There are many issues with the production and transportation of sodium hydroxide. The costs of manufacture and transportation are very high due to its corrosiveness and its high viscosity. As is well known with any chemical, its viscosity is inversely related to its temperature. That means the viscosity decreases as temperature increases and the viscosity of sodium hydroxide plays a direct role in its application as well as its storage and transportation. While the 'chlor-alkali' process has lower cost advantages, the electric power needed for the electrolysis adds significant costs to process. The electrical costs accounts for 51-58 percent of the 'chlor-alkali' production costs when producing sodium hydroxide and chlorine.

From a review of the above noted prior art, none of the prior art teaches or make obvious the concepts set forth herein. Likewise, in view of the high costs set forth above for previous processes, it is desirable to have a process that overcomes the above problems and shortcomings.

Other objects, features, and advantages of the subject design will become more apparent from the following detailed description of the following embodiments and certain modifications thereof when taken together with the accompanying drawings.

SUMMARY OF THE INVENTION

According to the present design, a process is provided that chemically mixes water and a blended solution with a solubilizer to produce an ionic solid and an alkaline liquid solution. The subject concept is operational to overcome the high costs of competitive processes and to improve their overall functionality.

DETAILED DESCRIPTION

Figure 1:
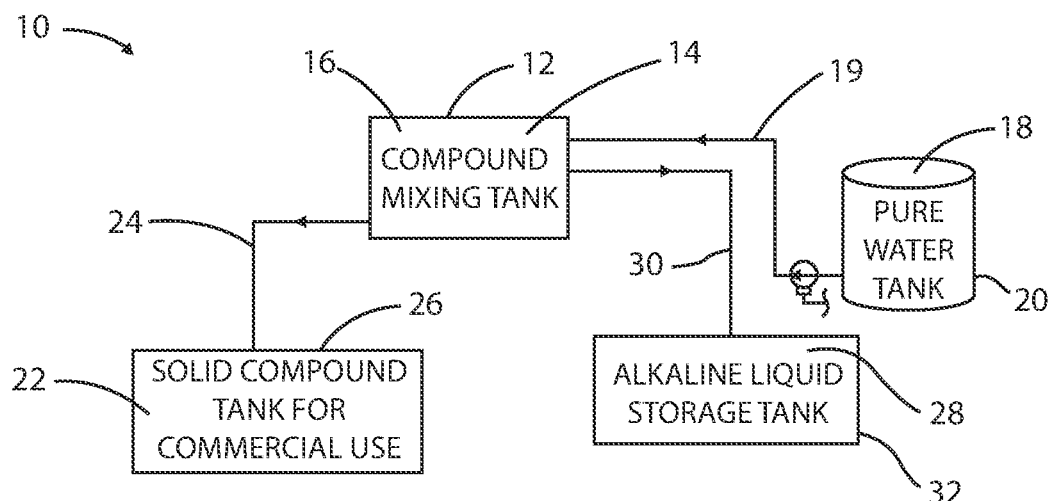
FIG. 1 is a partial flow chart and a partial diagrammatic representation of an embodiment of the subject concept.

Referring to FIG. 1 of the drawings, a process 10 is provided. A solution mixing tank 12, containing water, receives one blended solution 14 for mixing with a solubilizer 16. As the two blended solutions 14,16 are mixed, a chemical reaction occurs therebetween. The chemical reaction in the mixing tank 12 creates an ionic solid 22 that is delivered by line 24 to an ionic solid tank 26 for commercial use. The chemical reaction also creates an alkaline liquid solution 28 that is delivered by line 30 to an alkaline liquid storage tank 32. It is recognized that the alkaline liquid solution in the liquid storage tank 32 could be used further as needed. As set forth, it is further recognized that several different blended solutions and solubilizers could be used in the embodiment of FIG. 1 without departing from the essence of the subject invention. Some desired inputs and outputs will be set forth hereafter with respect to the remaining Figs. Likewise, depending on the selected blended solution chosen to mix with the selected solubilizer desired ionic solids and alkaline liquid solutions will be produced. For example, some desired outputs will be calcium phosphate and calcium carbonate (ionic solids), and sodium hydroxide, sodium carbonate, potassium hydroxide, lithium hydroxide and potassium phosphate (alkaline liquid solutions).

Figure 1A:
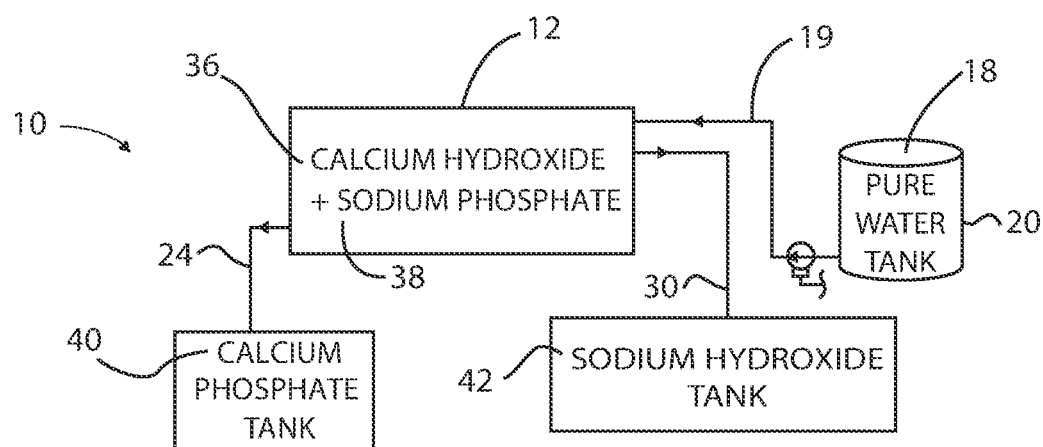
FIG. 1A is a partial flow chart and a partial diagrammatic representation of a more detailed concept from the embodiment of FIG. 1.

Referring to FIG. 1A, an embodiment is illustrated providing a solution mixing tank 12, containing water from a source of water 18, receives calcium hydroxide 36 (blended solution), and sodium phosphate 38 (solubilizer). The result of the chemical reaction between the calcium hydroxide 36 and the sodium phosphate 38 are calcium phosphate 40 (an ionic solid) and sodium hydroxide 42 (an alkaline liquid solution). The calcium phosphate 40 is now available for commercial use. Likewise, the sodium hydroxide 42 is available for additional processing or if desirable, it could be sold for commercial uses.

Figure 1B:
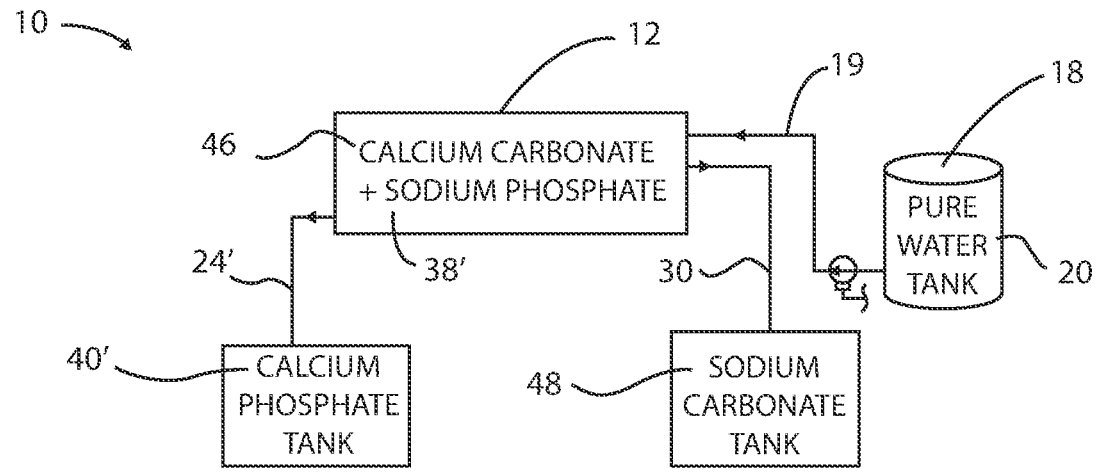
FIG. 1B is a partial flow chart and a partial diagrammatic representation of another more detailed concept from the embodiment of FIG. 1.

Referring to FIG. 1B, another embodiment is illustrated providing a solution mixing tank 12, containing water from a source of water 18, receives a calcium carbonate 46 (blended solution), and a sodium phosphate 38 (solubilizer). The results of the chemical reaction between the calcium carbonate 46 and the sodium phosphate 38 creates calcium phosphate 40 (an ionic solid) and sodium carbonate 48 (alkaline liquid solution). The calcium phosphate 40 is now available for commercial use. Likewise, the sodium carbonate solution 48 is now available for additional processing or available for commercial uses.

Figure 1C:
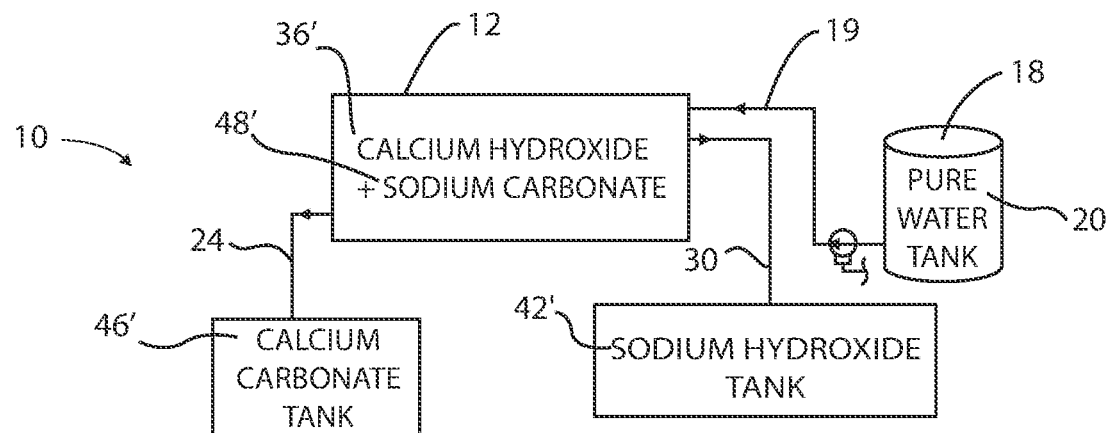
FIG. 1C is a partial flow chart and a partial diagrammatic representation of yet another more detailed concept from the embodiment of FIG. 1.

Referring to FIG. 1C, yet another embodiment is illustrated providing a solution mixing tank 12, containing water from a source of water 18, receives calcium hydroxide 36' (blended solution), and sodium carbonate solution 48' (solubilizer). The results of the chemical reaction between the calcium hydroxide solution 36' and the sodium carbonate solution 48' creates calcium carbonate 46' (an ionic solid) and a sodium hydroxide solution 42' (alkaline liquid solution). The calcium carbonate 46' is now available for commercial use. Likewise, the sodium hydroxide solution 42' is now available for additional processing or available for commercial uses.

Kiln dust are predominately solid by-products generated during cement and lime kiln production operations. In both lime kiln dust (LKD) and cement kiln dust (CKD), various amounts of calcium oxide (CaO) and 'free lime' are present. Depending on the collection location, calcium carbonate may also be present along with different types of oxides, such as, potassium oxide ($K_2O$) and, magnesium oxide (MgO). These oxides also react with the sodium carbonate ($Na_2CO_3$) to produce additional sodium oxide ($Na_2O$), which when mixed in water becomes sodium hydroxide (NaOH).

The mixing of the solubilizer with the kiln dust in water, chemically produces calcium carbonate in addition to the alkaline solution. The calcium carbonate is one of the main material inputs necessary for the manufacture of cement and lime. By using kiln dust as a blended solution with or instead of calcium hydroxide, a lot of processing costs will be saved.

Figure 1D:
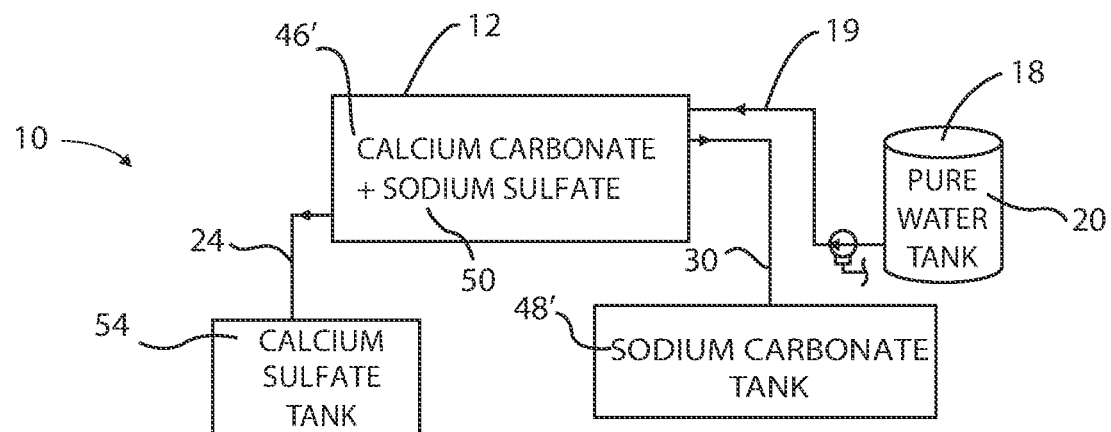
FIG. 1D is a partial flow chart and a partial diagrammatic representation of still another more detailed concept from the embodiment of FIG. 1.

Referring to FIG. 1D, still another embodiment is illustrated providing a source of water 18, calcium carbonate 46' (blended solution), and sodium sulfate 50 (solubilizer). The results of the chemical reaction between the calcium carbonate 46' and the sodium sulfate 50 creates calcium sulfate 54 (an ionic solid) and a sodium carbonate solution 48' (alkaline liquid solution). The calcium sulfate 54 and the sodium carbonate solution 48' may each be used in one of the current processes or sold for other commercial uses.

By replacing the calcium carbonate 46' in mixing tank 12 (FIG. 1D) with a calcium hydroxide 36, different results are achieved, in that, the ionic solid is the same but the alkaline liquid solution is now a sodium hydroxide solution 42 (alkaline liquid solution).

From a review of the above embodiments, there are numerous combinations of a blended solution mixed with a solubilizer to achieve various results for various uses.

INDUSTRIAL APPLICABILITY

The subject process with the various examples provides simple, safe, cost-effective designs for producing the alkaline liquid solutions and ionic solid for use in the current or additional processes and/or sold for other commercial uses. The subject designs far exceed the other suppliers of these products in production cost effectiveness, more secure ways of storing the products, and in many applications, not needing to store the product but keep redirecting it for other application on site.

With use of kiln dusts in the subject process, large volumes of kiln dust will not be stored in huge piles or used as land fill throughout the country. The Federal Highway Administration (FHA) reported that approximately 14.2 million tons of cement kiln dust (CKD) are produced annually and approximately 2 to 4 million tons of lime kiln dust (LKD) are generated each year in the United States. Most of this kiln dust is disposed of in landfills or stockpiles, with 100 million tons currently stockpiled throughout the country. Even though some of this kiln dust can be sold, the cement/lime industry still incurs high costs for handling the kiln dust. In some applications, the kiln dust could be used in another process as it is being generated Other embodiments as well as certain variations and modifications of the embodiments herein shown and described will obviously occur to those skilled in the art upon becoming familiar with the underlying concept. It is to be understood, therefore that the subject design, as claimed, may be practiced otherwise than as specifically set forth above.

What is claimed is:

1. A process consisting of mixing only one of the blended solutions of calcium hydroxide and calcium carbonate with only one of the solubilizers of sodium phosphate and sodium carbonate, in a mixing tank with water to chemically produce only one of the ionic solids of calcium phosphate and calcium carbonate, and only one of the alkaline liquid solutions of sodium hydroxide and sodium carbonate.

2. The process of claim 1, wherein the only one of the blended solutions is calcium hydroxide and the only one of the solubilizers is one of sodium phosphate and sodium carbonate, to chemically produce only the ionic solid calcium phosphate, and only one of the alkaline liquid solutions of sodium hydroxide and sodium carbonate.

3. The process of claim 1, wherein the only one of the blended solutions is calcium carbonate and the only one of the solubilizers is sodium phosphate, to chemically produce only the ionic solid of calcium phosphate and only the alkaline liquid solution of sodium carbonate.

4. The process of claim 1, wherein the only one of the blended solutions is calcium hydroxide and the only one of the solubilizers is sodium carbonate, to chemically produce only the ionic solid of calcium carbonate and only the alkaline liquid solution of sodium hydroxide.

* * * * *